(12) United States Patent
Wu et al.

(10) Patent No.: US 6,587,179 B2
(45) Date of Patent: Jul. 1, 2003

(54) HIGH CONTRAST RATIO REFLECTIVE STN LCD STRUCTURE

(75) Inventors: Yi-Chun Wu, Hua-Lien (TW); Shin-Tson Wu, Northridge, CA (US)

(73) Assignee: Wintek Corporation, Taichung (TW)

( * ) Notice: Subject to any disclaimer, the term of this patent is extended or adjusted under 35 U.S.C. 154(b) by 181 days.

(21) Appl. No.: 09/892,495

(22) Filed: Jun. 28, 2001

(65) Prior Publication Data

US 2003/0001996 A1 Jan. 2, 2003

(51) Int. Cl.[7] .................. G02F 1/1335; C09K 19/02
(52) U.S. Cl. .................. 349/179; 349/106; 349/113
(58) Field of Search ............... 349/179, 106, 349/113

(56) References Cited

U.S. PATENT DOCUMENTS 6,130,736 A * 10/2000 Sasaki et al. ............ 349/122

6,373,540 B1 * 4/2002 Munakata ............ 349/117

FOREIGN PATENT DOCUMENTS

JP          5005864       * 1/1993

* cited by examiner

*Primary Examiner*—Julie Ngo
(74) *Attorney, Agent, or Firm*—Rosenberg, Klein & Lee

(57) ABSTRACT

A high contrast ratio reflective STN LCD structure including an glass substrate panel, a liquid crystal layer and a lower glass substrate panel. The upper glass substrate panel includes only one optical deflector. The phase compensating film disposed under the optical deflector has a quarter of wavelength. The liquid crystal molecules of the liquid crystal layer have torsion angle within 180° to 210°. The retardation value of the liquid crystal molecules is within 580 nm to 650 nm.

4 Claims, 4 Drawing Sheets

HIGH CONTRAST RATIO REFLECTIVE STN LCD STRUCTURE

BACKGROUND OF THE INVENTION

The present invention is related to a high contrast ratio reflective STN LCD structure in which the liquid crystal molecules have smaller torsion angle and the retardation value of the liquid crystal molecules is controlled within 580 nm to 650 nm.

FIG. 4 shows a conventional reflective liquid crystal display (LCD). One single optical deflector 71 is laid over an upper glass panel 7. A reflector 82 is laid over a lower glass panel 8 for reflecting light and eliminating parallax so as to promote displaying quality of the LCD. However, at least two phase compensating films 72 are disposed under the single optical deflector 71. The two layers of phase compensating films 72 have different retardation values, in which the lower phase compensating film 72 has a retardation value within 100 nm to 180 nm, while the upper phase compensating film 72 has a retardation value within 200 nm to 360 nm. In phase coupling, such structure will encounter complicated problem of phase compensation and it is relatively difficult to manufacture such product. As a result, the ratio of defective product is higher.

Moreover, the liquid crystal molecules 81 of the liquid crystal layer 8 have high torsion angle within 220° to 240°. This leads to higher spectrum of the liquid crystal layer 8. The phase compensating films 72 are unable to totally phase-compensate the entire range of light (different colors with different wavelengths). This results in leakage of light in dark-state and lowers the contrast ratio effect of the LCD.

SUMMARY OF THE INVENTION

It is therefore a primary object of the present invention to provide a high contrast ratio reflective STN LCD structure which includes only one optical deflector. The liquid crystal molecules of the LCD have smaller torsion angle, whereby the penetration ratios of lights with different wavelengths can be lowered to be proximate to 0%. Accordingly, the leakage of light in dark-state is reduced and the contrast ratio is enhanced. Therefore, the spectrum of the liquid crystal layer can be effectively controlled and it is unnecessary to use two or more phase compensating films. The manufacturing procedure is thus simplified and the ratio of good product is increased.

The present invention can be best understood through the following description and accompanying drawings wherein:

DETAILED DESCRIPTION OF THE PREFERRED EMBODIMENT

Figure 1:
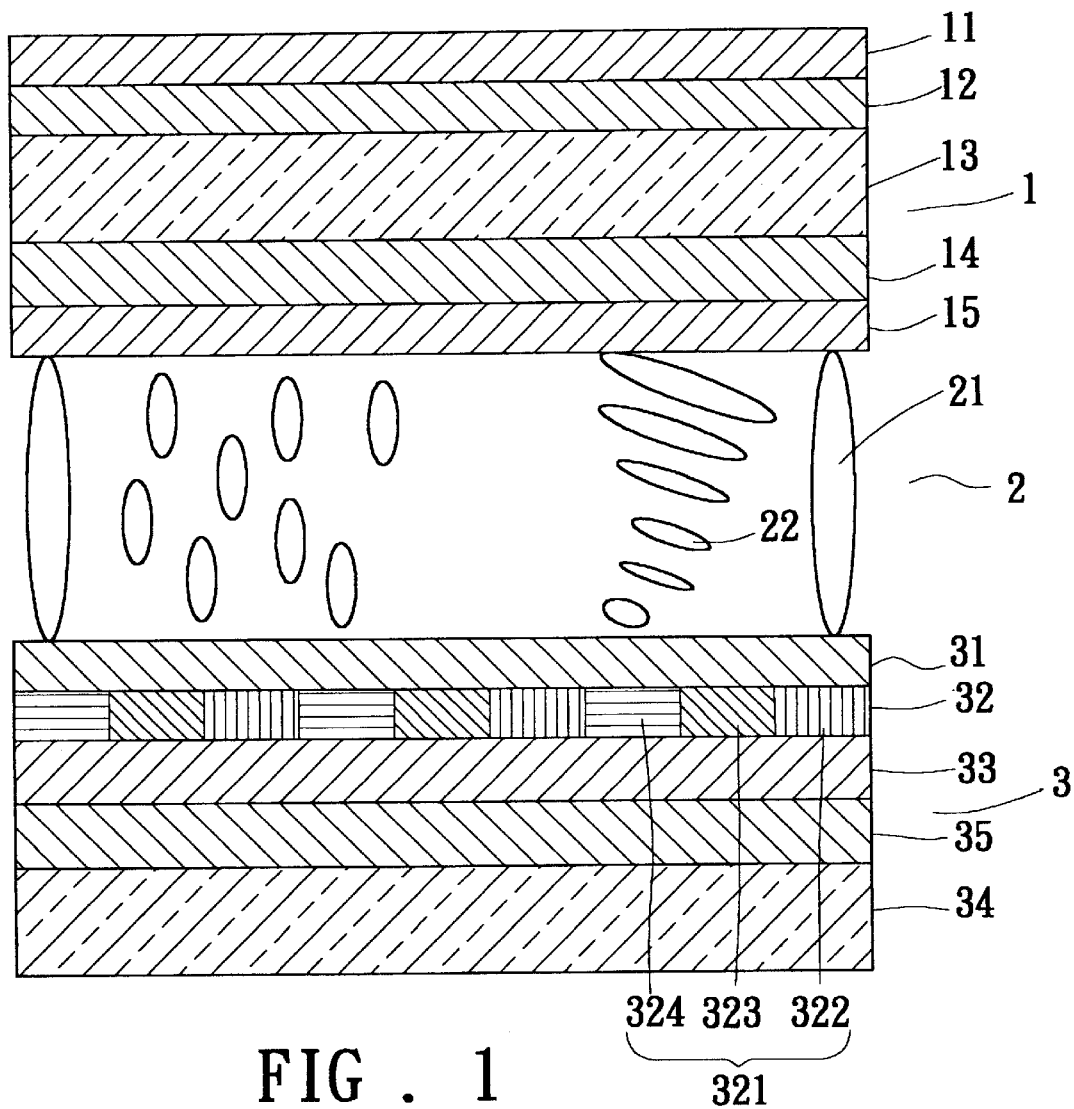
FIG. 1 is a sectional view of the LCD structure of the present invention.
Figure 2:
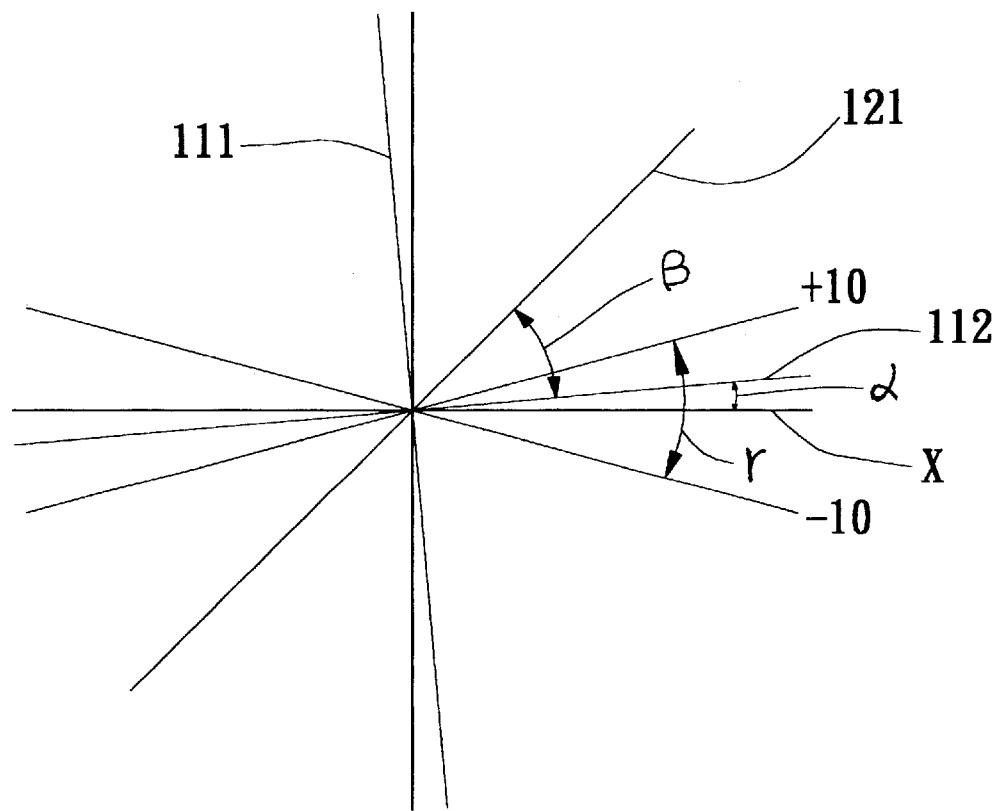
FIG. 2 is a view showing the lower rubbing angle of the liquid crystal molecules and the horizontal angle contained by the absorption axis of the optical deflector and the slow axis of the phase compensating film of the present invention.
Figure 3:
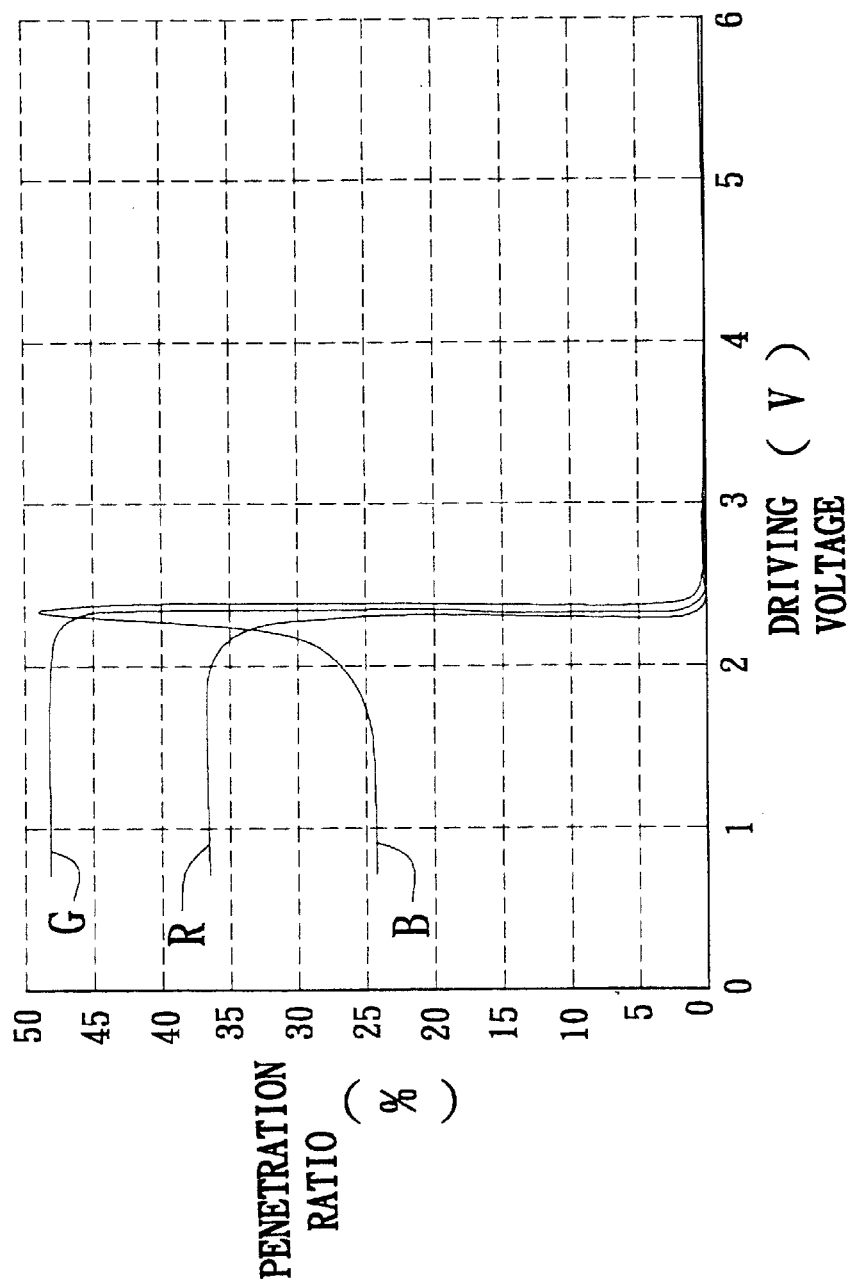
FIG. 3 is a curve diagram of the penetration ratio versus driving voltage in a test of the present invention.
Figure 4:
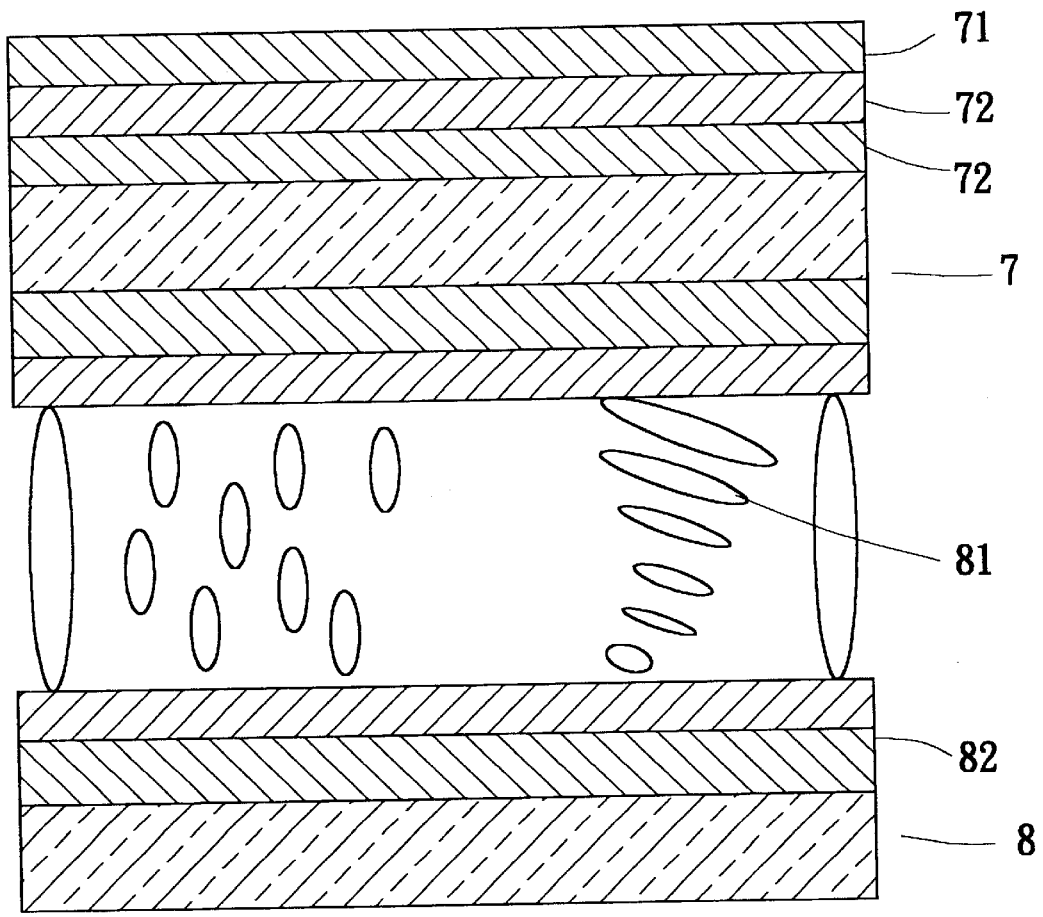
FIG. 4 is a sectional view of a conventional reflective LCD structure.

Please refer to FIGS. 1 to 3. The present invention includes an upper glass substrate panel 1, a liquid crystal layer 2 and a lower glass substrate panel 3.

The upper glass substrate panel 1 includes:

an optical deflector 11 laid on an uppermost side of the upper glass panel 1, the optical deflector 11 having a horizontal penetration axis 111 and a horizontal absorption axis 112 normal to the penetration axis 111;

a phase compensating film 12 disposed under the optical deflector 11 and having a quarter of wavelength and a slow axis 121;

an upper glass panel 13 laid under the phase compensating film 12;

an upper electrode 14 laid under the upper glass panel 13; and an upper alignment layer 15 laid under the upper electrode 14.

The liquid crystal layer 2 is disposed under the upper alignment layer 15. The top portion of the liquid crystal layer 2 is aligned by the upper alignment layer 15. The liquid crystal layer 2 includes numerous spacers 21 connected with the bottom of the upper alignment layer 15. The liquid crystal layer 2 is composed of numerous liquid crystal molecules 22.

The lower glass substrate panel 3 is disposed under the liquid crystal layer 2, including:

a lower alignment layer 31 laid under the liquid crystal layer 2, the bottom of the liquid crystal layer 2 being aligned by the lower alignment layer 31;

a color-filter 32 laid under the lower alignment layer 31 and having numerous pixels 321, each pixel 321 being composed of a red block 322, a green block 323 and a blue block 324;

a reflector 33 laid under the color-filter 32;

a lower electrode 35 laid under the reflector 33; and a lower glass panel 34 laid under the lower electrode 35.

Please refer to FIG. 2. The liquid crystal molecules 22 of the liquid crystal layer 2 have torsion angle within 180° to 210°. The retardation value (delta nd) of the liquid crystal molecules 22 is within 580 nm to 650 nm. The absorption axis 112 of the optical deflector 11 and the horizontal axis X of the upper glass substrate panel 1 contain an angle $\alpha$ of 5°. The absorption axis 112 of the optical deflector 11 and the slow axis 121 of the phase compensating film 12 contain a horizontal angle $\beta$ of 45°. The penetration axis 111 of the optical deflector 11 and the liquid crystal molecules 22 of the liquid crystal layer 2 contain a lower rubbing angle $\gamma$ within −10° to 10°.

Please refer to FIG. 3. For example, the torsion angle of the liquid crystal molecules 22 of the liquid crystal layer 2 is set 210° and the retardation value (delta nd) thereof is 630 nm. The lower rubbing angle $\gamma$ contained by the penetration axis 111 of the optical deflector 11 and the liquid crystal molecules 22 of the liquid crystal layer 2 is 10°. The wavelengths of the red block 322, green block 323 and blue block 324 of the pixel 321 of the color-filter 32 are respectively 634 nm, 550 nm and 740 nm. A test is performed with different driving voltages applied to the upper and lower electrodes 14, 35, when the voltage exceeds 2.7 volts, the penetration ratios of the red light R, green light G and blue light B of the red block 322, green block 323 and blue block 324 are lowered to be proximate to 0%. Accordingly, with one single optical deflector 11, the present invention can achieve excellent phase compensation at different wavelengths. Also, in dark-state, the leakage of light of the present invention is reduced so that a better contrast ratio can be achieved.

In conclusion, the liquid crystal molecules 22 have smaller torsion angle and the retardation value (delta nd) of the liquid crystal molecules 22 is controlled within 580 nm to 650 nm. With one single optical deflector 11, the penetration ratios of lights with different wavelengths can be lowered to be proximate to 0%. The leakage of light in dark-state is reduced and the contrast ratio is enhanced. Accordingly, the spectrum of the liquid crystal layer 2 can be effectively controlled and it is unnecessary to use two or more phase compensating films. The manufacturing procedure is thus simplified and the ratio of good product is increased.

The above embodiment is only used to illustrate the present invention, not intended to limit the scope thereof. Many modifications of the above embodiment can be made without departing from the spirit of the present invention.

What is claimed is:

1. A high contrast ratio reflective STN LCD structure comprising an upper glass substrate panel, a liquid crystal layer and a lower glass substrate panel, wherein:

the upper glass substrate panel includes:
   an optical deflector laid on an uppermost side of the upper glass panel, the optical deflector having a horizontal penetration axis and a horizontal absorption axis normal to the penetration axis;
   a phase compensating film disposed under the optical deflector and having a quarter of wavelength and a slow axis;
   an upper glass panel laid under the phase compensating film;
   an upper electrode laid under the upper glass panel; and
   an upper alignment layer laid under the upper electrode;

the liquid crystal layer is disposed under the upper alignment layer, a top portion of the liquid crystal layer being aligned by the upper alignment layer, the liquid crystal layer including numerous spacers connected with a bottom of the upper alignment layer, the liquid crystal layer being composed of numerous liquid crystal molecules; and the lower glass substrate panel is disposed under the liquid crystal layer, including:
   a lower alignment layer laid under the liquid crystal layer, a bottom of the liquid crystal layer being aligned by the lower alignment layer;
   a color-filter laid under the lower alignment layer and having numerous pixels, each pixel being composed of a red block, a green block and a blue block;
   a reflector laid under the color-filter;
   a lower electrode laid under the reflector; and
   a lower glass panel laid under the lower electrode, the liquid crystal molecules of the liquid crystal layer having torsion angle within 180° to 210°, the retardation value of the liquid crystal molecules being within 580 nm to 650 nm.

2. A high contrast ratio reflective STN LCD structure as claimed in claim 1, wherein the absorption axis of the optical deflector and the horizontal axis of the upper glass substrate panel contain an angle of 5°.

3. A high contrast ratio reflective STN LCD structure as claimed in claim 1, wherein the absorption axis of the optical deflector and the slow axis of the phase compensating film contain a horizontal angle of 45°.

4. A high contrast ratio reflective STN LCD structure as claimed in claim 1, wherein the penetration axis of the optical deflector and the liquid crystal molecules of the liquid crystal layer contain a lower rubbing angle within −10° to 10°.

* * * * *